United States Patent
Taverizatshy et al.

(10) Patent No.: US 8,460,450 B2
(45) Date of Patent: Jun. 11, 2013

(54) RAPID DRYING, WATER-BASED INK-JET INK

(75) Inventors: Liat Taverizatshy, Hadera (IL); Or Brandstein, Haifa (IL); Efrat Soroker, Zur Moshe (IL); Eylan Cohen, Raanana (IL)

(73) Assignee: Hewlett-Packard Development Company, L.P., Houston, TX (US)

(*) Notice: Subject to any disclaimer, the term of this patent is extended or adjusted under 35 U.S.C. 154(b) by 1775 days.

(21) Appl. No.: 11/602,581

(22) Filed: Nov. 20, 2006

(65) Prior Publication Data

US 2008/0118657 A1    May 22, 2008

(51) Int. Cl.
*C09D 11/02* (2006.01)

(52) U.S. Cl.
USPC .............. 106/31.6; 106/31.65; 106/31.86

(58) Field of Classification Search
USPC .................. 106/31.6, 31.65, 31.86
See application file for complete search history.

(56) References Cited

U.S. PATENT DOCUMENTS

| | | | |
|---|---|---|---|
| 4,853,036 A | 8/1989 | Koike | |
| 5,100,471 A | 3/1992 | Winnik et al. | |
| 5,716,435 A * | 2/1998 | Aida et al. | 106/31.85 |
| 6,193,792 B1 | 2/2001 | Fague | |
| 6,485,138 B1 | 11/2002 | Kubota et al. | |
| 6,533,408 B1 | 3/2003 | Erdtmann et al. | |
| 2002/0073893 A1 * | 6/2002 | Campbell | 106/31.86 |
| 2002/0149656 A1 * | 10/2002 | Nohr et al. | 347/95 |
| 2003/0117476 A1 * | 6/2003 | Cross et al. | 347/107 |
| 2004/0097615 A1 | 5/2004 | Reem et al. | |
| 2007/0281140 A1 * | 12/2007 | Haubrich et al. | 428/206 |

FOREIGN PATENT DOCUMENTS

| | | |
|---|---|---|
| EP | 0887391 | 12/1998 |
| JP | 06171072 | 6/1994 |
| JP | 11080628 | 3/1999 |
| JP | 2006103285 | 4/2006 |
| JP | 2006122900 | 5/2006 |
| WO | 2006043571 | 4/2006 |
| WO | 2006/130144 A1 | 12/2006 |

OTHER PUBLICATIONS

JP Office Action for JP Application No. 2009-537,383 dated Jan. 31, 2012.

* cited by examiner

*Primary Examiner* — Kaj K Olsen
*Assistant Examiner* — Veronica F Faison

(57) ABSTRACT

The present invention is drawn to ink compositions and methods for ink-jet recording. The ink-jet ink can comprise water and at least 20 wt % solids. The solids can include pigment particulates and silica particulates dispersed in the ink-jet ink, as well as solid humectant substantially dissolved in the ink-jet ink. The pigment particulates, silica particulates, and solid humectant substantially remain with a dried image that is printed using the ink-jet ink of the present invention.

36 Claims, No Drawings

RAPID DRYING, WATER-BASED INK-JET INK

BACKGROUND OF THE INVENTION

The ink-jet printing industry uses different types of recording fluids such as oil-based inks, solvent-based (non-aqueous) inks, water-based inks, and solid inks (which are melted in preparation for dispensing). Solvent-based inks are fast drying, and as a result, are widely used for industrial printing. When solvent-based inks containing binders and other ingredients are jetted onto a substrate, the solvent(s) partially or fully evaporate from the ink, leaving the binder and other ingredients such as pigment particles on the printed substrate in the form of a dry film. During the drying process, the solvents, which are often volatile organic compounds (VOC), emit vapors, and therefore, can pollute the environment. The pollution problem becomes more critical for higher printing speeds or for wide format images, where large amounts of ink are deposited onto a substrate.

As a result of this and other concerns, efforts related to preparing inks that are environmentally friendly have moved some research in the direction of water based inks. However, the drying time and energy often required for water based inks can be longer than is desirable. The drying time of the water based inks can be an obstacle in increasing printing speed of ink-jet printers. Thus, there is a need for water based inks that can be dried with less time and/or with a lower energy requirement.

DETAILED DESCRIPTION OF THE PREFERRED EMBODIMENT(S)

Reference will now be made to exemplary embodiments, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art having possession of this disclosure, are to be considered within the scope of the present invention. In describing and claiming the present invention, the following terminology will be used in accordance with the definitions set forth below.

The singular forms "a," "an," and "the" include plural referents unless the context clearly dictates otherwise. Thus, for example, reference to "a pigment" includes one or more of such materials, unless the context clearly dictates otherwise.

As used herein, "liquid vehicle" is defined to include liquid compositions that can be used to carry pigments and other solids to a substrate. Liquid vehicles in general are well known in the art, and a wide variety of ink vehicles may be used in accordance with embodiments of the present invention. Such ink vehicles may include a mixture of a variety of different agents, including without limitation, water, surfactants, co-solvents, buffers, biocides, viscosity modifiers, sequestering agents, stabilizing agents, de-foaming agents, etc. Other than the pigment, the liquid vehicle can also carry other solids to an image, such as latex particulates and other polymers and resins, solid humectants, silica, plasticizers, etc.

The term "solids" refers to components that are present in an ink-jet ink that, upon printing on a substrate and drying, remain with the printed image as a solid component. In an ink-jet ink, the "solids" can be dissolved in the ink, but are still considered solids because they do not readily evaporate upon printing and drying. Further, dispersed solid material, e.g., pigments, silica, etc., are also considered solids.

The term "solid humectant" refers to components of an ink-jet ink that are at least mostly dissolvable in an ink-jet ink, and while in that dissolved form, perform as a humectant, e.g., maintaining architecture health, performing similar to a liquid humectant when dissolved, providing hygroscopic quality to ink which enables it to retain moisture in a print head, etc.

The term "Hazardous Air Pollutants" or "HAPs" is a broad term applied to any chemical, physical (e.g. particulate matter), or biological agent that releases environmental contaminants negatively modifying the natural characteristics of the atmosphere. Accordingly, non-HAPs are materials that do not release environmental contaminants modifying the natural characteristics of the atmosphere. The U.S. Environmental Protection Agency (EPA) has published a list of hazardous air pollutants (HAPs), which is found in the Clean Air Act 112(b) (as amended 1990). These solvents are known to be air pollutants. Though the inks of the present invention do not have to be non-HAPs, it is emphasized that none of these listed solvents are present in ink-jet inks in embodiments that are specifically referred to as non-HAPs inks or inks that do not include HAPs. etc. HAPs solvents are listed as follows: Acetaldehyde, Acetamide, Acetonitrile, Acetophenone, 2-Acetylaminofluorene, Acrolein, Acrylamide, Acrylic acid, Acrylonitrile, Allyl chloride, 4-Aminobiphenyl, Aniline, o-Anisidine, Asbestos, Benzene (including benzene from gasoline), Benzidine, Benzotrichloride, Benzyl chloride, Biphenyl, Bis(2-ethylhexyl)phthalate (DEHP), Bis(chloromethyl)ether, Bromoform, 1,3-Butadiene, Calcium cyanamide, Caprolactam (including modifications), Captan, Carbaryl, Carbon disulfide, Carbon tetrachloride, Carbonyl sulfide, Catechol, Chloramben, Chlordane, Chlorine, Chloroacetic acid, 2-Chloroacetophenone, Chlorobenzene, Chlorobenzilate, Chloroform, Chloromethyl methyl ether, Chloroprene, Cresols/Cresylic acid (isomers and mixture), o-Cresol, m-Cresol, p-Cresol, Cumene, 2,4-D salts and esters, DDE, Diazomethane, Dibenzofurans, 1,2-Dibromo-3-chloropropane, Dibutylphthalate, 1,4-Dichlorobenzene(p), 3,3-Dichlorobenzidene, Dichloroethyl ether (Bis(2-chloroethyl)ether), 1,3-Dichloropropene, Dichlorvos, Diethanolamine, N,N-Diethyl aniline (N,N-Dimethylaniline), Diethyl sulfate, 3,3-Dimethoxybenzidine, Dimethyl aminoazobenzene, 3,3'-Dimethyl benzidine, Dimethyl carbamoyl chloride, Dimethyl formamide, 1,1-Dimethyl hydrazine, Dimethyl phthalate, Dimethyl sulfate, 4,6-Dinitro-o-cresol and salts, 2,4-Dinitrophenol, 2,4-Dinitrotoluene, 1,4-Dioxane (1,4-Diethyleneoxide), 1,2-Diphenylhydrazine, Epichlorohydrin (1-Chloro-2,3-epoxypropane), 1,2-Epoxybutane, Ethyl acrylate, Ethyl benzene, Ethyl carbamate (Urethane), Ethyl chloride (Chloroethane), Ethylene dibromide (Dibromoethane), Ethylene dichloride (1,2-Dichloroethane), Ethylene glycol, Ethylene imine (Aziridine), Ethylene oxide, Ethylene thiourea, Ethylidene dichloride (1,1-Dichloroethane), Formaldehyde, Heptachlor, Hexachlorobenzene, Hexachlorobutadiene, Hexachlorocyclopentadiene, Hexachloroethane, Hexamethylene-1,6-diisocyanate, Hexamethylphosphoramide, Hexane, Hydrazine, Hydrochloric acid, Hydrogen fluoride (Hydrofluoric acid), Hydrogen sulfide (including modification), Hydroquinone, Isophorone, Lindane (all isomers), Maleic anhydride, Methanol, Methoxychlor, Methyl bromide (Bromomethane), Methyl chloride (Chloromethane), Methyl chloroform (1,1,1-Trichloroethane), Methyl ethyl ketone (2-Butanone) (including modification), Methyl hydrazine, Methyl iodide (Iodomethane), Methyl isobutyl ketone (Hexone), Methyl isocyanate, Methyl methacrylate, Methyl tert butyl ether, 4,4-Methylene bis(2-chloroaniline), Methylene chloride (Dichloromethane), Methylene diphenyl diisocyanate (MDI), 4,4-Methylenedianiline, Naphthalene, Nitrobenzene, 4-Nitrobiphenyl, 4-Nitrophenol, 2-Nitropropane, N-Nitroso-N-methylurea, N-Nitrosodimethylamine, N-Nitrosomorpholine, Parathion, Pentachloronitrobenzene (Quintobenzene), Pentachlorophenol, Phenol, p-Phenylenediamine, Phosgene, Phosphine, Phosphorus, Phthalic anhydride, Polychlorinated biphenyls (Aroclors), 1,3-Propane sultone, beta-Propiolactone, Propionaldehyde, Propoxur (Baygon), Propylene dichloride (1,2-Dichloropropane), Propylene oxide, 1,2-Propylenimine (2-Methyl aziridine), Quinoline, Quinone, Styrene, Styrene oxide, 2,3,7,8-Tetrachlorodibenzo-p-dioxin, 1,1,2,2-Tetrachloroethane, Tetrachloroethylene (Perchloroethylene), Titanium tetrachloride, Toluene, 2,4-Toluene diamine, 2,4-Toluene diisocyanate, o-Toluidine, Toxaphene (chlorinated camphene), 1,2,4-Trichlorobenzene, 1,1,2-Trichloroethane, Trichloroethylene, 2,4,5-Trichlorophenol, 2,4,6-Trichlorophenol, Triethylamine, Trifluralin, 2,2,4-Trimethylpentane, Vinyl acetate, Vinyl bromide, Vinyl chloride, Vinylidene chloride (1,1-Dichloroethylene), Xylenes (isomers and mixture), o-Xylenes, m-Xylenes, p-Xylenes, Antimony Compounds, Arsenic Compounds (inorganic including arsine), Beryllium Compounds, Cadmium Compounds, Chromium Compounds, Cobalt Compounds, Cyanide Compounds (including XCN where X=H or any other group where a formal dissociation may occur. For example KCN or Ca(CN)$_2$), Glycol ethers (including mono- and di-ethers of ethylene glycol, diethylene glycol, and triethylene glycol); R—(OCH$_2$CH$_2$)$_n$—OR' where n=1, 2, or 3; R=alkyl or aryl groups; and R'=R, H, or groups which, when removed, yield glycol ethers with the structure: R—(OCH$_2$CH)$_n$—OH— (Polymers are excluded from the glycol category), Lead Compounds, Manganese Compounds, Mercury Compounds, Fine mineral fibers (including mineral fiber emissions from facilities manufacturing or processing glass, rock, or slag fibers (or other mineral derived fibers) of average diameter 1 micrometer or less), Nickel Compounds, Polycylic Organic Matter (including organic compounds with more than one benzene ring, and which have a boiling point greater than or equal to 100° C.), Radionuclides (including radon and other materials that spontaneously undergo radioactive decay), and Selenium Compounds. For all listings above which contain the word "compounds" and for glycol ethers, the following applies: Unless otherwise specified, these listings are defined as including any unique chemical substance that contains the named chemical (e.g., antimony, arsenic, etc.) as part of that chemical's infrastructure. It is noted that HAPs compounds can include compounds other than those listed above, as may be shown by independent testing, or as the list is expanded over a period of time.

As used herein, a plurality of items, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical values, such as ratios, concentrations, amounts, molecular sizes, etc., may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

Aspects of the present invention are directed to ink compositions and related methods. It is noted that compositions and methods of the present invention share certain commonalities and characteristics. Some of these characteristics will be discussed in the context of the compositions, and others will be described in the context of the methods. It should be noted that regardless of where discussed, each of the following descriptions applies generally to the compositions and methods of the present invention. Further, in the following detailed description, numerous specific details are set forth in order to provide a thorough understanding of the ink. However, it will be understood by those of ordinary skill in the art that the present ink may be practiced without these specific details. In other instances, well-known methods, procedures, formulation and compositions have not been described in detail so as not to obscure the nature of the present ink.

Water-based inks, or aqueous inks, typically include a water-based liquid vehicle including ingredients such as water, co-solvent(s), humectant(s), stabilizer(s), anti-foaming agent(s), surfactants, as well as other liquids. Typically, these liquids are soluble or miscible with the water, and a colorant, i.e. dye or pigment, is added to the liquid vehicle. The energy and time required to dry aqueous inks depends on the amount of liquids, such as water and other ingredients that are in the ink.

With this background in mind, it has been recognized that by significantly increasing the proportion of solid ingredients in an aqueous ink, durable images can be ink-jetted onto various substrates with reduced drying/evaporation time. This increase in solids can be achieved by adding components which will contribute to the properties of the printed image, but which can still be effectively printed from ink-jet architecture. In accordance with this, an ink-jet ink can comprise water and at least 20 wt % solids. The solids can include pigment particulates and silica particulates dispersed in the ink-jet ink, as well as solid humectant substantially dissolved in the ink-jet ink. The pigment particulates, silica particulates, and solid humectant can substantially remain with a dried image that is printed using this ink-jet ink.

In another embodiment, a method of printing an image can comprise jetting an ink-jet ink onto a substrate, where the ink-jet ink comprises water and at least 20 wt % solids. The solids can include pigment particulates and silica particulates dispersed in the ink-jet ink, as well as solid humectant substantially dissolved in the ink-jet ink. Resulting from drying of one form or another, e.g., ambient, heat, air flow, light, etc., the method can include the step of forming a film of pigment particulates and silica particulates which are embedded within an organic solid which includes the solid humectant.

In some embodiments, as described, the amount of solids can be at least 20 wt % of the ink-jet ink as a whole. However, in other embodiments, the amount of solids can be at least 35 wt % or even at least 50 wt % of the ink-jet ink formulation as a whole. Thus, the liquid content of the liquid vehicle can be reduced (and the solid content increased), by replacing some of the liquid vehicle components with solid ingredients, such as solid humectant, pigments, silica, resins/polymers, etc. The drying time and energy can be significantly reduced over other similar inks because of the high solids content, as well as the choice of solids as described herein. For example, without limitation, the ink-jet ink can be formulated to be dried within 10 seconds under a 1000 watt IR lamp at 100° C., where the ink-jet ink is applied as a 24 micron thick layer to corrugated board using a drawdown method. In another embodiment, the ink-jet ink can be formulated to be dried within 5 seconds under a 1000 watt IR lamp at 80° C. upon drawdown of a 24 micron thick layer of the ink-jet ink on corrugated board. It is noted that this application method is not a typical ink-jet printing method, but is useful in characterizing the fast drying nature of the ink-jet inks of the present invention. In certain embodiment, the ink-jet inks of the present invention can have a surface tension below 35 dyne/cm and/or a viscosity from 8 cp to 25 cp, each at 25° C.

Turning now to the specific solids that can be included, solid humectants are particularly beneficial for use. Liquid humectants are typically added to ink-jet ink formulations to act as a wetting agent for ink-jet architecture and to prevent the architecture from drying out. By using a water-dissolvable solid (such as a water soluble polymer which acts as a humectant when dissolved) that transforms back to a solid state after a printed image is dried, no energy is needed to evaporate the humectant, as it will be formulated to remain with the printed image upon drying. This reduces the drying energy and drying time, while providing advantages related to image permanence.

In one embodiment, solid polyethylene glycol (PEG) can be used as a dissolvable humectant. Other suitable soluble humectants that can be used include glucose, methoxypolyethylene glycol (MPEG), mixtures thereof, and the like. Specifically, with respect to PEG, this material in molecular weights of 1000 Mw and above can be manifest as a solid at room temperature. In one embodiment, the weight average molecular weight of the PEG can range from 1000 Mw to 8000 Mw. Optionally, a liquid PEG can also be present in addition to the solid PEG. In these embodiments, the liquid PEG, e.g., about 200 Mw to less than 1000 Mw, or from about 200 Mw to about 800 Mw) can be present in the ink in relatively minor amounts, e.g., 0.01 wt % to 4 wt % or from 0.1 wt % to 2 wt %. In this embodiment, it is notable that solid PEG when dissolved in an ink can maintain appropriate amounts moisture in the print head, thereby protecting print head health over a period of time, but when jetted and dried by liquid evaporation, the PEG will forms a solid film on the substrate surface. The PEG can also serve as a wax, which is desirable in industrial printing in order to achieve abrasion resistance. The solid humectant can be present at from 1 wt % to 35 wt % of the ink-jet ink as a whole, though it is typically present at from 5 wt % to 20 wt %.

In addition to the presence of the solid humectant, other solids can be present to increase the solid content of the ink as a whole, while retaining acceptable printing and image-forming characteristics. For example, in addition to the solid humectant, silica particulates can also be included as an ink ingredient. Suitable silica particulates that can be use include fumed silica, silica chips, silica colloids, etc. Specific examples of appropriate silica particulates that can be used include those available from DuPont Company under the names: Ludox AM-30, Ludox CL, Ludox HS-30; and those available from Nyacol Nanotechnologies Company under the names: NexSil 12, NexSil 20, NexSil 8, Nexsil 20, Nexsil 85. The silica particulates can be present at from 1 wt % to 50 wt % of the ink-jet ink as a whole, though often at from 1 wt % to 20 wt %. In one embodiment, the silica particulates are nanoparticulates in the size range of 6 nm to 85 nm.

In addition, as the ink-jet inks described herein utilize pigment colorants, the pigment particulates content will add to the total solids concentration of the ink. The pigment particulates can be self-dispersed pigments, polymer-coated pigments, or more standard pigments, including milled pigments, that can utilize a separate dispersing agent that enables appropriate suspension of the pigment in the ink-jet ink. Non-limiting examples of pigments that can be used in accordance with embodiments of the present invention include yellow pigments having the following Yellow Pigment color index PY 83, PY 151, PY 150, and PY 154. Magenta pigments composed of Red pigment having color indices of PR 202, PR 254 and PR 122 and Violet pigment having color indices of PV 19, PV 23 and PV 29 can also be used. Blue pigments having color indices of PB 15:3, 15:4, 15:2, and 15:1, as well as Hostafine Blue B2G and Microlith Blue 4G-Wa, as well as black pigments having color indices of PBL Black 7 are also useable. is another example of an acceptable pigment for use. Examples of other pigments that can be used include so called "spot color pigments," which are pigments that are of a color other than cyan, magenta, yellow, or black, and which are difficult to reproduce by mixing colors. Specific spot color pigments that can be used include Cromophtal Orange GL (PO-64) or Microlith Green G-K (PG 7), both available from Ciba Company, Basel CH-4002 Switzerland. Typically, the pigment solids can be preset at from 0.01 wt % to 8 wt % of the ink-jet ink as a whole, and often, from 0.01 wt % to 5 wt %.

In addition to the solid humectant, the pigment particulates, and the silica particulates, other solids can optionally be present, including polymeric resins that are at least substantially dissolvable in the ink-jet ink, and/or latex particulates or other polymeric dispersions that are suspended in the ink-jet ink. Exemplary resins, latexes, or other polymers that can be used include acrylic polymers such as styrene-acrylic co-polymers, colloidal emulsions, resins in solution, vinyl pyrrolidone co-polymers, polyvinyl pyrrolidone, urethane or polyurethane dispersions, acrylic-urethane hybrid dispersions, or the like. More specific exemplary resins that can be used include those from Johnson Polymers (BASF) under the names: Joncryl 661, Joncryl 8003, Joncryl 8078, Joncryl 8082, Joncryl 537, Joncryl 538, Joncryl 142, Joncryl 631, Joncryl HPD 671, or Joncryl HPD 71E. Other non-limiting examples of resins or polymers that can be used include acrylic resins available commercially from ROHM & HAAS Company under the names: Rhoplex I-1955, Rhoplex I-2426D, Rhoplex I-62, Rhoplex I-98, Rhoplex E-1691, Lucidene 190, Lucidene 400, o Lucidene 243; from DSM Company under the names: NeoCryl A-1110, NeoCryl A-2092, NeoCryl A-639, NeoRad R-440, NeoRad R-441, NeoRez R-551, or NeoRez R-972; from ISP Company under the names: PVP K-15, PVP K-30, PVP K-60, PVP K-85, Ganex P-904LC, PVPNA W-635, or PVPNA S-630, to name a few. The polymer content can range from 1 wt % to 35 wt % of the ink-jet ink as a whole, though it is typically from 5 wt % to 20 wt %

When the ink is printed and dried, there will be a combination of dried solid humectant, dried silica particulates, and dried pigment pigments, and optionally, other dried solids remaining with the image, the combination of which forms a durable, printed film. In one embodiment, this film can include pigment colorant and silica particulates embedded within an organic solid which includes the solid humectant, and optionally, other additional solids, e.g., polymeric binder. These rapid drying inks in accordance with embodiments of the present invention allow for increased printing throughput and decrease energy consumption required for drying of the image.

In addition to the solids content and the water, other co-solvents can be present as part of a liquid vehicle (which includes the water). Exemplary solvents that can be used include glycol ether solvents, which can include, Tripropylene glycol mono methyl ether, Propylene glycol methyl ether, Propylene glycol ethyl ether, Propylene glycol butyl ether, Dipropylene glycol mono methyl ether, Dipropylene glycol ethyl ether, Dipropylene glycol butyl ether, Propylene glycol n-propyl ether, Dipropylene glycol n-propyl ether, Tripropylene glycol n-propyl ether, Propylene glycol n-butyl ether, Dipropylene glycol n-butyl ether, Tripropylene glycol n-butyl ether, Dipropylene glycol dimethyl ether (Proglyme). In other embodiments, solvents such as ketones and/or glycol co-solvents can be used. Though there is no limitation of the amount of organic co-solvent used, in one particular embodiment, the organic co-solvent can be present at less than 10 wt %, or even less than 2 wt % of the ink-jet ink as a whole.

Optionally, the inks of the present invention can be environmentally friendly, in that they can be free of HAPs (Hazardous Air Pollutants). It is noteworthy that the above-listed group of solvents is not included in the list of hazardous air polluting solvents released by the US Environmental Protection Agency (EPA). In another embodiment, the inks can be formulated to have very low Volatile Organic Compound (VOC), e.g., less than 5 wt %.

Though these inks can be printed on a wide variety of substrates, these inks are acceptable for printing on industrial coated and uncoated surfaces, such as (brown) corrugated boards (with or without a liner) without the need of pre-treatment, papers, coated papers, absorbing plastics, etc.

Non-limiting examples of other additives that can also be present as part of the liquid vehicle component (or solids component as appropriate) include surfactants or wetting agents, slip components, dispersants, leveling agents, preservatives, anti-molding agents, anti-foaming agents, stabilizers such as storage stability enhancing agents, and the like.

The dispersant(s), if added, can comprise one or more liquid vehicle or liquid vehicle dispersible component(s). Non-limiting examples of dispersants can include high molecular weight copolymers with pigment affinic groups, including block copolymers. Specific examples of dispersants include those commercially available from BYK Chemie GmbH, Postfach 100245 Wesel D-46462 Germany under the names BYK 348, BYK-345, BYK-346, BYK-347, BYK 301, BYK 302, BYK 308, BYK-024, BYK-023, BYK-036, BYK-080.

The surfactant(s), if added, can be anionic, cationic, non-ionic, amphoteric, silicon-free, fluorosurfactants, polysiloxanes, etc. In one embodiment, the surfactant can be a polyether siloxane copolymer surfactant. More specific examples of such materials include surfactants which can improve substrate wetting, such as those available commercially from Tego Chemie Service GmbH under the names Wet 510, Glide 100, Glide 450 and Glide 410 or Leveling agents, under the name Flow 425, Glide 406, or Glide 440; from Air Products and Chemicals Company under the name: Surfynol 104PG50, Surfynol 104, Surfynol SE, Surfynol MD30, Surfynol CT-121, Surfynol CT-141, or Surfynol CT-151; or from DuPont Company under the name: Zonyl FSO, Zonyl FSP, or Zonyl FS-62. Anti-foaming agents sold under the name: Foamex 800, Foamex 805, Foamex 845, Foamex 842, Foamex 835, or Twin 4000 can also be present.

Other additives that can be added include those known in the art.

The following example illustrates the embodiments of the invention that are presently best known. However, it is to be understood that the following is only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what are presently deemed to be the most practical and preferred embodiments of the invention.

EXAMPLE

Inks are prepared in accordance with embodiments of the present invention, as set forth in Table 1 below:

TABLE 1

| Ingredient | Wt % |
|---|---|
| Water | 40-75 |
| Polyethylene glycol 1000-8000 Mw (Solid Humectant Dissolved in Solution) | 5-20 |
| Polyethylene glycol 200-800 Mw (Liquid Humectant) | 0.1-2 |
| Tripropylene glycol monomethyl ether, Dipropylene glycol monomethyl ether, Dipropylene glycol dimethyl ether, and/or 2-pyrrolidinone (Co-solvents) | 0.5-5 |
| AMP-95 (Amine) | 0.1-1.5 |
| Joncryl 661, Joncryl 8003, Joncryl 8078, Joncryl 8082, Joncryl 142, NeoCryl A-2029, Lucidene 243, PVP K-15, and/or Ganex P904LC (Resins) | 5-20 |
| BYK 348, BYK 345, BYK 308, Surfynol 104, PG50, Surfynol 104, Tego Foamex 800, Tego Glide 440, and/or Zonyl FSO (Surfactant/Anti-foaming Agent) | 0.01-0.5 |
| Hostafine Blue B2G, Microlith 4G-WA, Orange GL, and/or Microlith Green G-K (Pigment Particulates) | 5-15 |
| Ludox AM-30, Ludox CL, Ludox HS-30, and/or NexSil 20 (Silica Nanoparticles) | 5-20 |

Formulations can have at least 20 wt % solids, at least 35 wt % solids, or at least 50 wt % solids.

In accordance with the Example provided in Table 1, ink can be prepared to have a surface tension below 35 dyne/cm and a viscosity of 8-25 cp at 25° C. Upon evaporation of the liquid components from the ink, a composite solid film of pigment, organic resin, inorganic silica nanoparticles, and PEG remain at the printed surface. An ink prepared in accordance with Table 1 was tested by drawdown of a 24 micron thick layer on currogated board and dried under a 1000 watt IR lamp. For comparison purposes a similar layer of industrial ink, i.e., HP Scitex WB300 Supreme ink, was also drawn. The drying time of the ink prepared in accordance with Table 1 was very short, i.e. 5-10 sec at 80-100° C., as compared to the above-mentioned commercially available water-based industrial ink-jet ink for wide format printing, i.e. 40-50 seconds drying at 80-100° C.

The ink examples above are merely exemplary, and thus, resin choice, silica choice, pigment choice, solid humectant choice, etc., amounts of the same, as well as other components and amounts can be modified to achieve desired results in accordance with embodiments of the present invention. Thus, while certain features of the inks have been illustrated and described herein, many modifications, substitutions, changes, and equivalents will now occur to those of ordinary skill in the art. It is, therefore, to be understood that the appended claims are intended to cover all such modifications and changes as fall within the true parameters of the ink.

What is claimed is:

1. An ink-jet ink, comprising:
   water, and
   at least 35 wt % solids, said solids including pigment particulates and silica particulates dispersed in the ink-jet ink, as well as solid humectant substantially dissolved in the ink-jet ink, said ink-jet ink formulated such that pigment particulates, silica particulates, and solid humectant substantially remain with a dried image printed with said ink-jet ink.

2. The ink-jet ink of claim 1, comprising at least 50 wt % solids.

3. The ink-jet ink of claim 1, wherein further comprising an organic co-solvent admixed with the water as part of a liquid vehicle.

4. The ink-jet ink of claim 3, wherein the organic co-solvent includes at least one co-solvent selected from the group consisting of tripropylene glycol monomethyl ether; dipropylene glycol monomethyl ether; dipropylene glycol dimethyl ether; and 2-pyrrolidone.

5. The ink-jet ink of claim 1, wherein the pigment particulates are self-dispersed pigment particulates.

6. The ink-jet ink of claim 1, wherein the pigment particulates are milled pigment particulates.

7. The ink-jet ink of claim 1, wherein the silica particulates are nanoparticulates in the size range of 6 nm to 85 nm.

8. The ink-jet ink of claim 1, wherein the solid humectant includes at least one member selected from polyethylene glycol, glucose, and methoxypolyethylene glycol.

9. The ink-jet ink of claim 8, wherein the solid humectant is polyethylene glycol having a weight average molecular weight from about 1000 Mw to about 8000 Mw.

10. The ink-jet ink of claim 1, wherein the solids further include a polymeric resin that is at least substantially dissolvable in the ink-jet ink.

11. The ink jet ink of claim 1, wherein the solids further include latex particulates or dispersed polymer that is at least substantially suspended in the ink-jet ink.

12. The ink-jet ink of claim 1, wherein said ink jet ink does not contain any hazardous air pollutants (HAPs).

13. The ink-jet ink of claim 1, wherein the ink-jet ink is formulated to be dried within 10 seconds under a 1000 watt IR lamp at 100° C. upon drawdown of a 24 micron thick layer of the ink-jet ink on corrugated board.

14. The ink-jet ink of claim 1, wherein the ink-jet ink is formulated to be dried within 5 seconds under a 1000 watt IR lamp at 80° C. upon drawdown of a 24 micron thick layer of the ink-jet ink on corrugated board.

15. The ink-jet ink of claim 1, having a surface tension below 35 dyne/cm.

16. The ink-jet ink of claim 1, having a viscosity of 8 cp to 25 cp at 25° C.

17. A method of printing an image, comprising:
   a) jetting an ink-jet ink onto a substrate, said ink-jet ink, comprising:
      i) water, and
      ii) at least 35 wt % solids, said solids including pigment particulates and silica particulates dispersed in the ink-jet ink, as well as solid humectant substantially dissolved in the ink-jet ink; and
   b) upon drying, forming a film of pigment particulates and silica particulates which are embedded within an organic solid including the solid humectant.

18. The method of claim 17, wherein the ink jet ink comprises at least 50 wt % solids.

19. The method of claim 17, wherein further comprising at least one organic co-solvent admixed with the water as part of a liquid vehicle, said organic co-solvent selected from the group consisting of tripropylene glycol monomethyl ether; dipropylene glycol monomethyl ether; dipropylene glycol dimethyl ether; and 2-pyrrolidone.

20. The method of claim 17, wherein the solid humectant is polyethylene glycol having a weight average molecular weight from about 1000 Mw to about 8000 Mw.

21. The method of claim 17, wherein the solids of the ink jet ink further include a polymeric material that, upon the drying, becomes part of the organic solid.

22. The method of claim 17, wherein said ink-jet ink does not contain any hazardous air pollutants (HAPs).

23. The method of claim 17, wherein the ink-jet ink is formulated to be dried within 10 seconds under a 1000 watt IR lamp at 100° C. upon drawdown of a 24 micron thick layer of the ink-jet ink on corrugated board.

24. An ink-jet ink, comprising:
   water, and
   at least 20 wt % solids, said solids including pigment particulates and silica particulates dispersed in the ink-jet ink, as well as solid humectant substantially dissolved in the ink-jet ink, said solid humectant including at least one member selected from polyethylene glycol, glucose, and methoxypolyethylene glycol, said ink-jet ink being formulated such that pigment particulates, silica particulates, and solid humectant substantially remain with a dried image printed with said ink-jet ink.

25. The ink-jet ink of claim 24, wherein the solid humectant is polyethylene glycol having a weight average molecular weight from about 1000 Mw to about 8000 Mw.

26. The ink-jet ink of claim 24, further comprising an organic co-solvent admixed with the water as part of the liquid vehicle, said organic co-solvent including at least one co-solvent selected from the group consisting of tripropylene glycol monomethyl ether; dipropylene glycol monomethyl ether; dipropylene glycol dimethyl ether; and 2-pyrrolidone.

27. The ink-jet ink of claim 24, wherein the pigment particulates are self-dispersed pigment particulates.

28. The ink-jet ink of claim 24, wherein the pigment particulates are milled pigment particulates.

29. The ink jet ink of claim 24, wherein the silica particulates are nanoparticulates in the size range of 6 nm to 85 nm.

30. The ink-jet ink of claim 24, wherein the solids further include a polymeric resin that is at least substantially dissolvable in the ink-jet ink.

31. The ink-jet ink of claim 24, wherein the solids further include latex particulates or dispersed polymer that is at least substantially suspended in the ink-jet ink.

32. The ink-jet ink of claim 24, wherein said ink-jet ink does not contain any hazardous air pollutants (HAPs).

33. The ink-jet ink of claim 24, wherein the ink-jet ink is formulated to be dried within 10 seconds under a 1000 watt IR lamp at 100° C. upon drawdown of a 24 micron thick layer of the ink-jet ink on corrugated board.

34. The ink-jet ink of claim 24, having a surface tension below 35 dyne/cm and a viscosity of 8 cp to 25 cp at 25° C.

35. A method of printing an image, comprising:
   a) jetting an ink-jet ink onto a substrate, said ink-jet ink, comprising:
      i) water, and
      ii) at least 20 wt % solids, said solids including pigment particulates and silica particulates dispersed in the ink-jet ink, as well as solid humectant substantially dissolved in the ink-jet ink, said solid humectant including at least one member selected from polyethylene glycol, glucose, and methoxypolyethylene glycol; and b) upon drying, forming a film of pigment particulates and silica particulates which are embedded within an organic solid including the solid humectant.

36. The method of claim 35, wherein the solid humectant is polyethylene glycol having a weight average molecular weight from about 1000 Mw to about 8000 Mw.

\* \* \* \* \*

UNITED STATES PATENT AND TRADEMARK OFFICE
CERTIFICATE OF CORRECTION

PATENT NO. : 8,460,450 B2
APPLICATION NO. : 11/602581
DATED : June 11, 2013
INVENTOR(S) : Liat Taverizatshy et al.

Page 1 of 1

It is certified that error appears in the above-identified patent and that said Letters Patent is hereby corrected as shown below:

On the Title Page, Item (75) Inventors section, "Eylan Cohen" should be --Eytan Cohen--.

Signed and Sealed this
Eighth Day of October, 2013

Teresa Stanek Rea
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,460,450 B2 |
| APPLICATION NO. | : 11/602581 |
| DATED | : June 11, 2013 |
| INVENTOR(S) | : Liat Taverizatshy et al. |

It is certified that error appears in the above-identified patent and that said Letters Patent is hereby corrected as shown below:

In the Claims

In column 9, line 36, in Claim 11, delete "ink jet" and insert -- ink-jet --, therefor.

In column 9, line 39, in Claim 12, delete "ink jet" and insert -- ink-jet --, therefor.

In column 9, line 64, in Claim 18, delete "ink jet" and insert -- ink-jet --, therefor.

In column 10, line 8, in Claim 21, delete "ink jet" and insert -- ink-jet --, therefor.

In column 10, line 41, in Claim 29, delete "ink jet" and insert -- ink-jet --, therefor.

Signed and Sealed this
Thirteenth Day of May, 2014

Michelle K. Lee
*Deputy Director of the United States Patent and Trademark Office*